United States Patent
Curran et al.

(10) Patent No.: US 9,105,047 B1
(45) Date of Patent: Aug. 11, 2015

(54) SYSTEM, METHOD, AND COMPUTER PROGRAM FOR PROVIDING CONTENT TO A USER UTILIZING A MOOD OF THE USER

(75) Inventors: David Curran, Tyrrelstown (IE); James Lynch, Ballycullen (IE); Keith Bradley, Sandyford (IE)

(73) Assignee: Amdocs Software Systems Limited, Dublin (IE)

( * ) Notice: Subject to any disclaimer, the term of this patent is extended or adjusted under 35 U.S.C. 154(b) by 763 days.

(21) Appl. No.: 13/314,107

(22) Filed: Dec. 7, 2011

(51) Int. Cl.
*G06F 15/16* (2006.01)
*G06Q 30/02* (2012.01)

(52) U.S. Cl.
CPC ........ *G06Q 30/0251* (2013.01); *G06Q 30/0254* (2013.01); *G06Q 30/0255* (2013.01)

(58) Field of Classification Search
CPC .......... G06Q 30/0251; G06Q 30/0254; G06Q 30/0255
USPC ........................................................ 709/204
See application file for complete search history.

(56) References Cited

U.S. PATENT DOCUMENTS

| | | | |
|---|---|---|---|
| 8,380,691 B1 * | 2/2013 | Tunguz-Zawislak | 707/705 |
| 8,843,551 B2 * | 9/2014 | Hayashi et al. | 709/204 |
| 2006/0143647 A1 * | 6/2006 | Bill | 725/10 |
| 2006/0170945 A1 * | 8/2006 | Bill | 358/1.13 |
| 2007/0255785 A1 * | 11/2007 | Hayashi et al. | 709/204 |
| 2008/0189169 A1 * | 8/2008 | Turpin et al. | 705/10 |
| 2008/0208973 A1 * | 8/2008 | Hayashi et al. | 709/204 |
| 2009/0062681 A1 * | 3/2009 | Pradeep et al. | 600/544 |
| 2009/0132368 A1 * | 5/2009 | Cotter et al. | 705/14 |
| 2009/0234718 A1 * | 9/2009 | Green | 705/10 |
| 2010/0057875 A1 * | 3/2010 | Bychkov et al. | 709/206 |
| 2010/0082427 A1 * | 4/2010 | Burgener et al. | 705/14.49 |
| 2010/0228582 A1 * | 9/2010 | King et al. | 705/7 |
| 2011/0055017 A1 * | 3/2011 | Solomon et al. | 705/14.66 |
| 2011/0112825 A1 * | 5/2011 | Bellegarda | 704/9 |
| 2011/0239137 A1 * | 9/2011 | Bill | 715/757 |
| 2012/0158503 A1 * | 6/2012 | Mardikar | 705/14.53 |
| 2012/0209907 A1 * | 8/2012 | Andrews et al. | 709/204 |
| 2013/0060860 A1 * | 3/2013 | Myslinski | 709/204 |
| 2013/0298044 A1 * | 11/2013 | Bill | 715/753 |

* cited by examiner

*Primary Examiner* — Imad Hussain
(74) *Attorney, Agent, or Firm* — Zilka-Kotab, PC

(57) ABSTRACT

A system, method, and computer program product are provided for providing content to a user utilizing a mood of the user. In use, data associated with a mood of a user is identified. Additionally, the mood of the user is determined, based on the data. Further, content is provided to the user, utilizing the mood of the user.

14 Claims, 6 Drawing Sheets

U.S. 9,105,047 B1

SYSTEM, METHOD, AND COMPUTER PROGRAM FOR PROVIDING CONTENT TO A USER UTILIZING A MOOD OF THE USER

FIELD OF THE INVENTION

The present invention relates to providing content, and more particularly to providing content to a user utilizing a mood of the user.

BACKGROUND

Advertising is a prominent source of revenue for online content providers. For example, advertising is presented in conjunction with Internet search results, web page content, etc. Unfortunately, conventional methods for increasing the relevance of such advertising have exhibited various limitations.

For example, users accessing online content may be in a particular mood while accessing such content. However, current advertising processes fail to address the mood of the user while providing advertising content to the user. There is thus a need for addressing these and/or other issues associated with the prior art.

SUMMARY

A system, method, and computer program product are provided for providing content to a user utilizing a mood of the user. In use, data associated with a mood of a user is identified. Additionally, the mood of the user is determined, based on the data. Further, content is provided to the user, utilizing the mood of the user.

DETAILED DESCRIPTION

Figure 1:
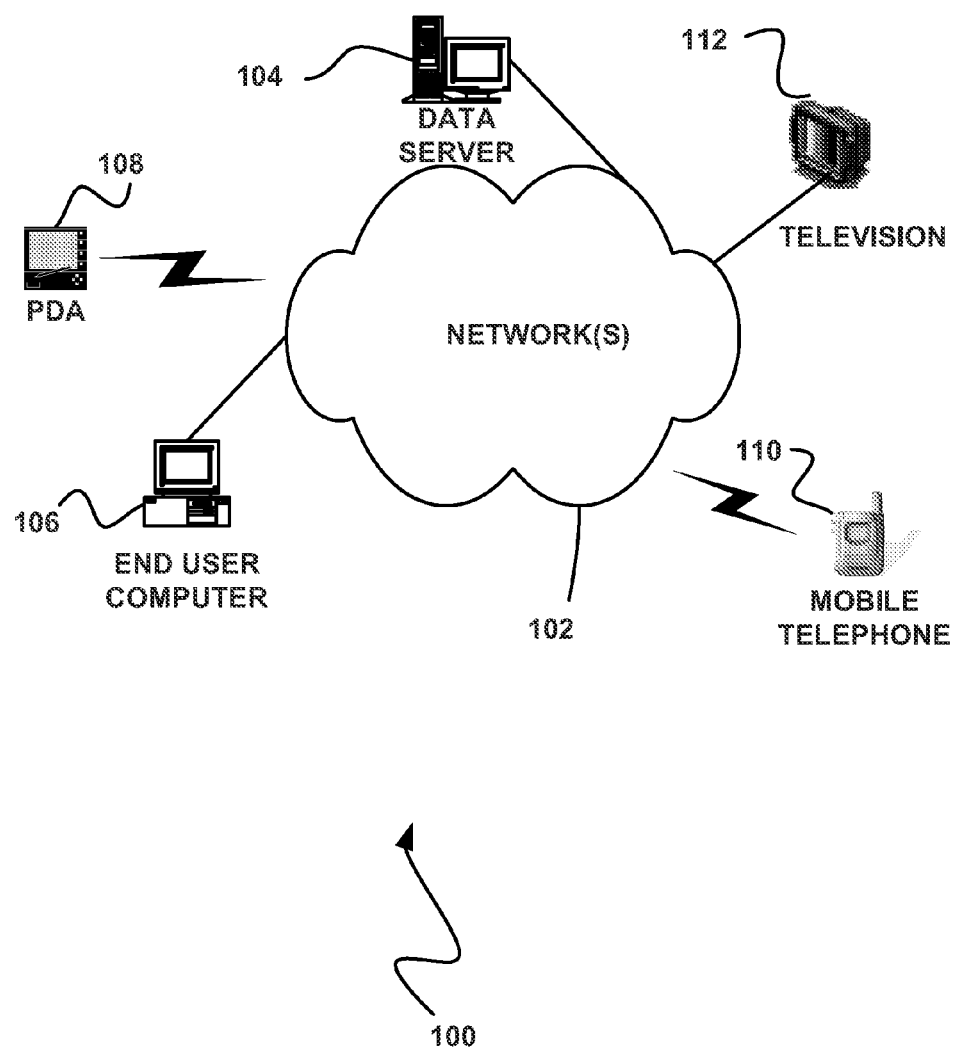
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
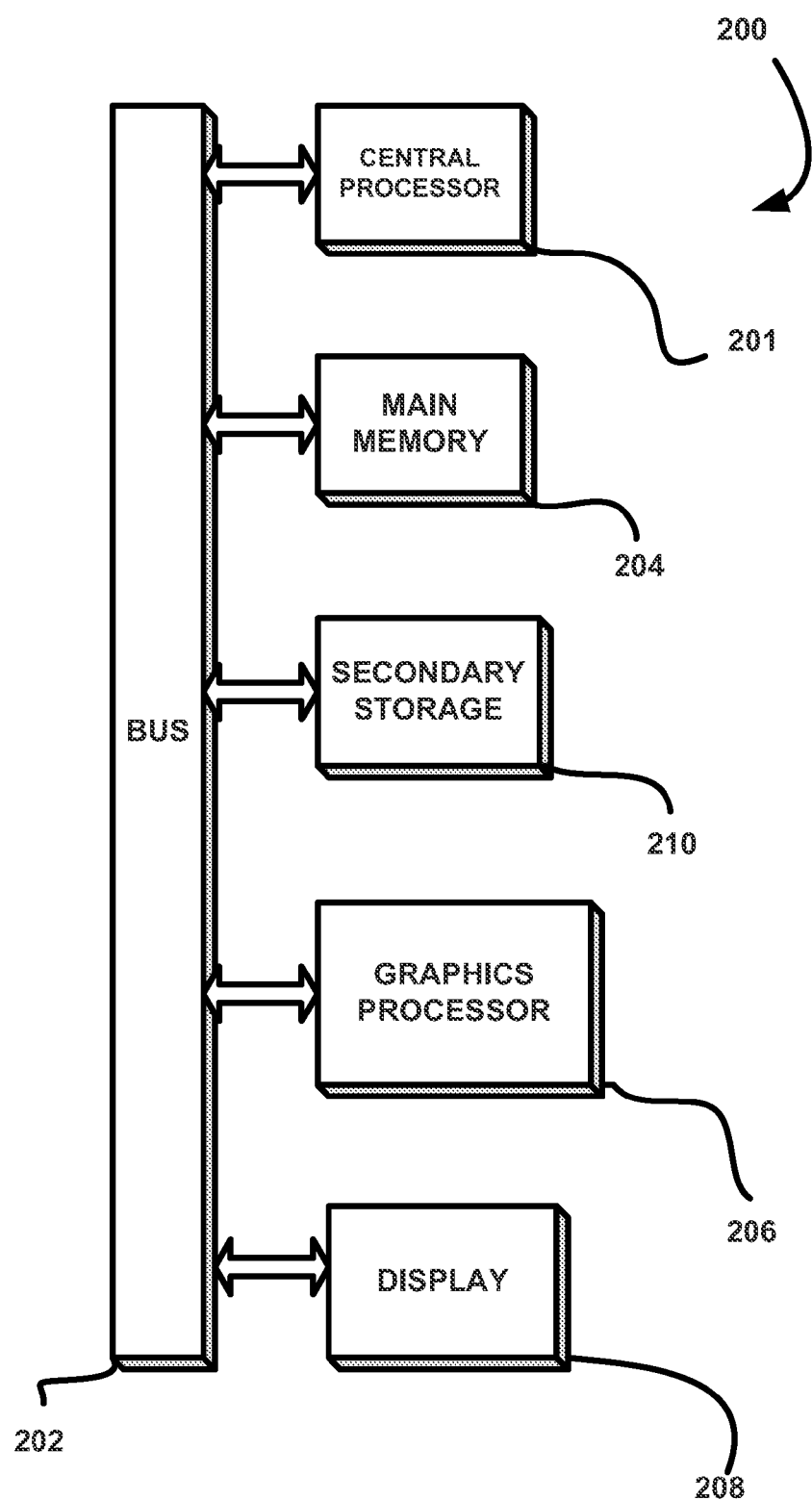
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
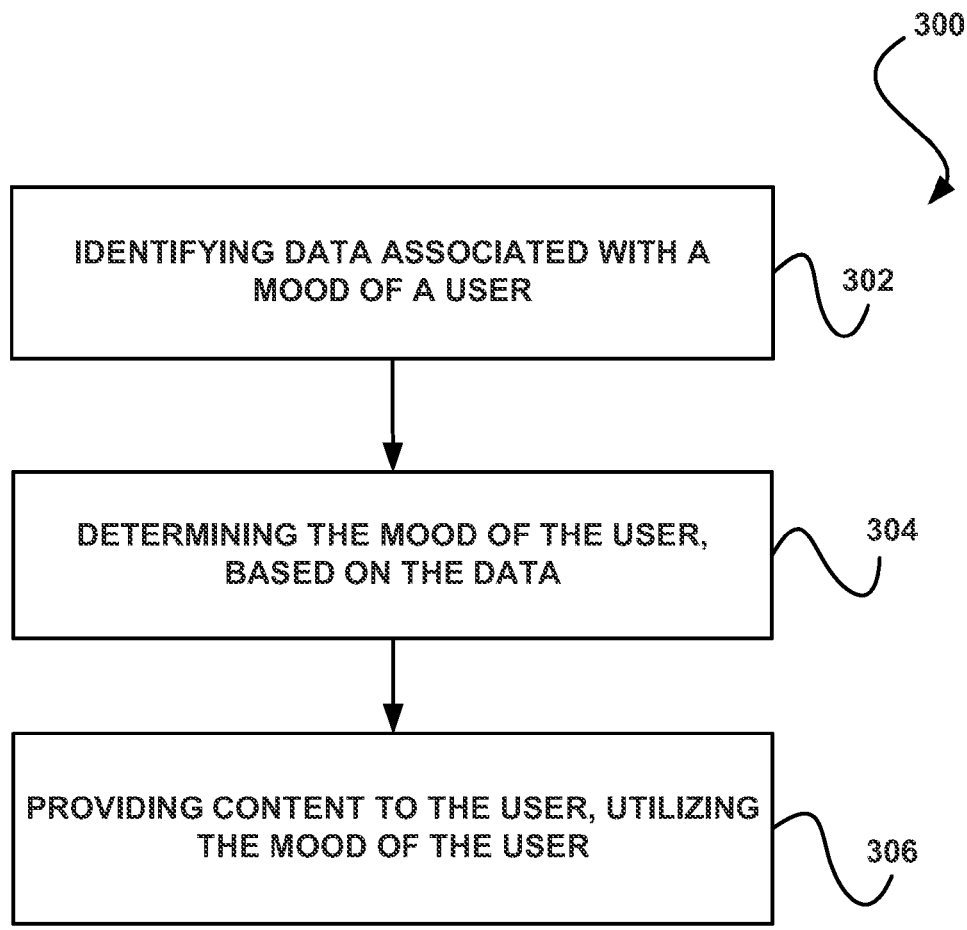
FIG. 3 illustrates a method for providing content to a user utilizing a mood of the user, in accordance with one embodiment.

FIG. 3 illustrates a method 300 for providing content to a user utilizing a mood of the user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, data associated with a mood of a user is identified. In one embodiment, the mood of the user may include an emotional state of the user. For example, the mood of the user may include a good (e.g., positive, etc.) mood, a bad (e.g., negative, etc.) mood, a neutral mood, etc. In another example, the mood of the user may be triggered by a plurality of stimuli, events, etc. In yet another example, the mood of the user may be long lasting (e.g., may last for hours, days, etc.). In another embodiment, the data associated with the mood of the user may include data associated with one or more actions performed by the user. For example, the data associated with the mood of the user may include data sent or received over a network (e.g., the Internet, etc.) by the user.

Additionally, in one embodiment, the data associated with the mood of the user may include data associated with one or more social networks. For example, the data associated with the mood of the user may include data (e.g., images, text, video, etc.) contributed by the user to a social network site, data read by the user from a social network site, data contributed to the social network site by members of the user's social network other than the user, etc. In another example, the data associated with the mood of the user may include data contributed to a social network by another user that shares one or more characteristics with the user. For example, the other user similar to the user may share one or more characteristics with the user (e.g., one or more moods, interests, geographical location, customer relationship management (CRM) elements, behavior, etc.).

Further, in one embodiment, the data associated with the mood of the user may include content consumed by the user. For example, the data associated with the mood of the user may include one or more web pages viewed by the user, files received (e.g., downloaded, etc.) by the user, media streamed by the user, etc. In another embodiment, the data associated with the mood of the user may include a location of the user. For example, the data associated with the mood of the user may include a physical location of the user determined by a global positioning system (GPS). In yet another embodiment, the data associated with the mood of the user may include one or more historical profiles associated with the user.

Further still, in one embodiment, the data associated with the mood of the user may include a behavior of the user. For example, the data associated with the mood of the user may include spending habits of the user, times during which the user utilizes a computer, etc. In yet another embodiment, the data associated with the mood of the user may include semantic data, data associated with an interest graph, data associated with an informational environment of the user, or any other data indicative of the mood of the user. In still another embodiment, the data associated with the mood of the user may include search query data. For example, the data associated with the mood of the user may include search queries performed by the user (e.g., queries performed utilizing a search engine, etc.), the results of such search queries, etc.

Further still, in one embodiment, the data associated with the mood of the user may be identified my monitoring one or more activities of the user. For example, the data may be identified by tracking the computer usage of the user. In another embodiment, the data associated with the mood of the user may be identified utilizing an interface. For example, the user may input data associated with their mood, utilizing the interface. In another embodiment, the data may include data associated with a mood of a plurality of users (e.g., a group of users, user that have one or more elements in common or share one or more characteristics, etc.). In yet another embodiment, the data may include physical movement of one or more computer peripherals. For example, the data may include a level of aggression associated with typing on a keyboard, movement of a mouse, etc., where such movement is monitored (e.g., utilizing one or more sensors, etc.).

Also, as shown in operation 304, the mood of the user is determined, based on the data. In one embodiment, the mood of the user may be determined by analyzing the data. In another embodiment, the mood of the user may be determined utilizing one or more classification and analysis methods in association with the data. For example, the mood of the user may be determined utilizing a naïve Bayes classifier (e.g., a classifier based on applying Bayes' theorem with strong (naïve) independence assumptions to the data, etc.), etc. In yet another embodiment, the mood of the user may be determined utilizing one or more criteria. For example, the mood of the user may be determined in terms of a positive or negative state of mind.

In addition, in one embodiment, the mood of the user may be determined as a single measure. For example, the mood of the user may be based on a single measure indicating how good or bad the user's mood is. In another example, the mood of the user may be determined as a plurality of measures. For example, the mood of the user may be based on a range of measures, where each measure may indicate a particular aspect of the mood (e.g., happiness, sadness, frustration, etc.). In another embodiment, mood may exist in more than a happy/sad dimension. For example, other dimensions of mood may be measured, such as valence (e.g., happiness/sadness), activation (e.g., arousal/relaxation), power (dominance/submissiveness), etc. In another embodiment, determining the mood of the user may account for a flexibility of a user's mood, a changeability of a user's mood, etc.

Furthermore, in one embodiment, determining the mood of the user may include calculating a score associated with the mood of the user. For example, an individual score may be determined based on the data as a measure of the mood of the individual user. In another embodiment, the score associated with the mood of the user may be a score associated with a group of users. For example, the score may include a community score that may include a mood score based on the data for a group of people, including the user. In another embodiment, the user may be a member of one or more groups, and may have a community score for each group they are a member of. In yet another embodiment, the mood of the user may be determined contextually. For example, one or more aspects of the user's present context (e.g., a uniform resource locator (URL) accessed by the user, etc.) may be used to determine the mood of the user. In yet another embodiment, the mood of the user may be influenced by one or more social circles, locations, etc. associated with the user, and each entity influencing the mood of the user may have a different effect on the mood of the user. A spouse of the user may have a strong influence on the mood of the user, whereas individuals in a similar physical area may have a lesser influence on the mood of the user, and individuals in the same company as the user may have an even lesser (but still existing) influence on the mood of the user.

Further still, in one embodiment, the score associated with the mood of the user may include a combination of one or more scores. For example, the score associated with the mood of the user may include an aggregation of a user's individual score based on the data and one or more community scores based on the data for communities that the user is a member of. In another embodiment, the score associated with the mood of the user may include a score associated with an item (e.g., a good, service, etc.). For example, the score associated with the mood of the user may include a score attributed to an item, where the item score may include a combination of mood scores for all users who have previously consumed the item.

Also, as shown in operation 306, content is provided to the user, utilizing the mood of the user. In one embodiment, the content may include one or more advertising elements. For example, the content may include a web-based advertisement, a banner advertisement, a pop-up advertisement, etc. In another example, the content may include one or more hyperlinks. In yet another example, the content may include one or more electronic mail messages, one or more short media service (SMS) text messages, one or more multimedia messaging system (MMS) messages, etc.

In another embodiment, the content may be provided to the user utilizing a web browser. For example, the content may be presented to the user within a web browser. In another embodiment, the content may be provided to the user with one or more search results. For example, the content may be provided to the user in conjunction with one or more search results provided by a search engine in response to a user search query.

Additionally, in one embodiment, providing the content to the user may include matching a score associated with the mood of the user to a score associated with the content. For example, the calculated score associated with the mood of the user may be matched to a score associated with the content, and the matching content may be provided to the user. In another example, the score associated with the content may be stored in a database (e.g., a database of content scores, etc.). In this way, relevant content may be identified for the user based on mood.

Further, in one embodiment, providing the content to the user may include targeting the content utilizing one or more algorithms. For example, the mood of the user may be used as an input into a signature algorithm, a signature technique, etc.

in order to determine the content to be provided to the user. In another embodiment, providing the content to the user may include determining whether the user is interested in a particular type of content. For example, the mood of the user may be used to determine a group of users interested in the particular type of content (e.g., a particular advertisement, etc.). See, for example, U.S. patent application Ser. No. 12/254, 310, filed Oct. 20, 2008, which is hereby incorporated by reference in its entirety, and which describes an example of providing personalized advertisements.

In one embodiment, a user's character may be described using a signature method as a series of scores associated with the interest of the user in one or more topics. For example, if a user has a medium score for fashion and a high score for sports, the user may view many sports related advertisements and fewer fashion related advertisements. In another example, when it is detected that the user sends a message stating "great day for a lovely walk," the mood of the user may be determined to be positive, good, etc. As a result, the user may then be shown advertisements that are popular with people interested in sports and fashion. In yet another example, if it is then detected that the user's spouse posts to an online forum stating "oh no, the pipe burst—disaster!" this may be used to reduce a mood of the user in a valence (happy/sad) dimension. As a result, the user may not be shown ads with as high of a happy score.

Figure 4:
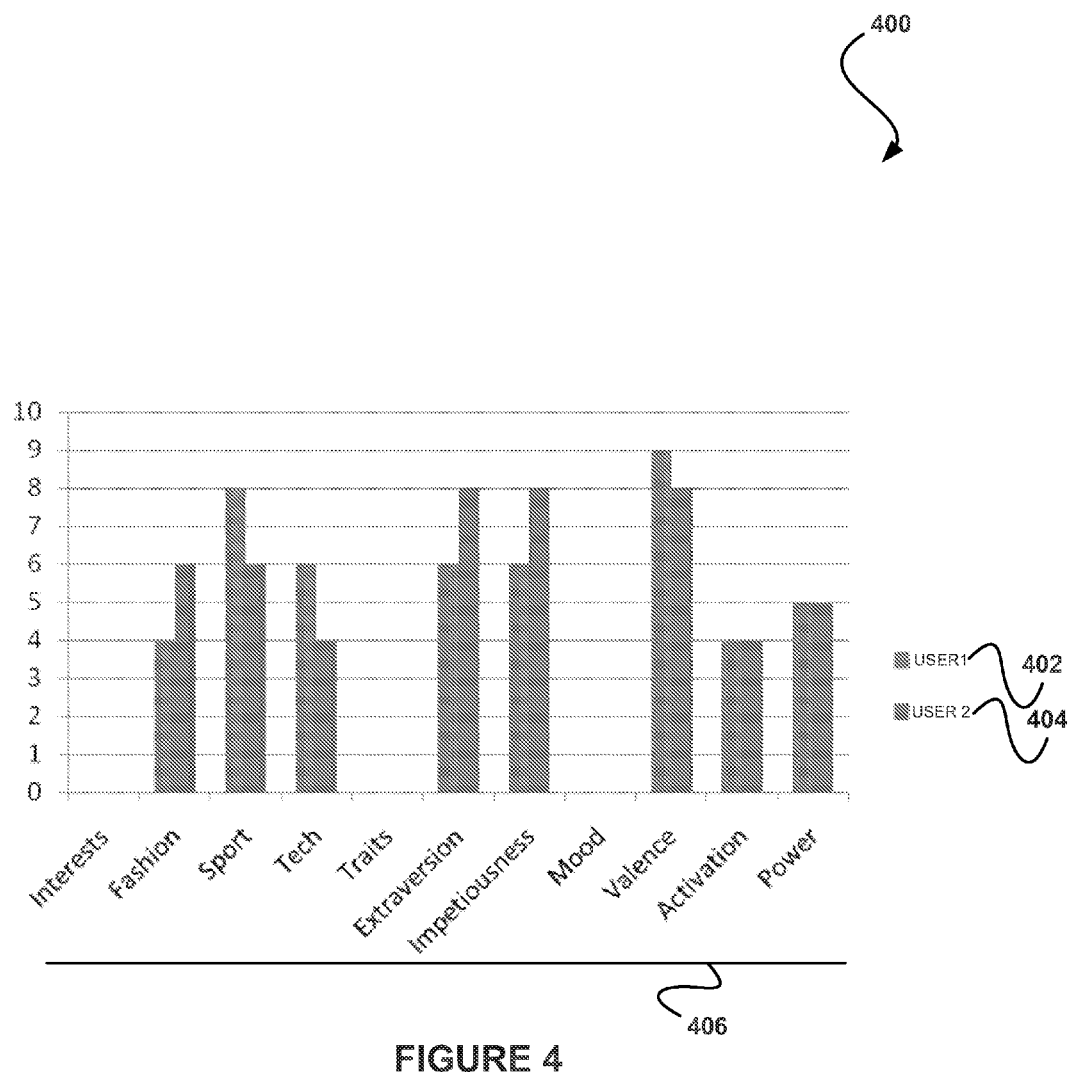
FIG. 4 illustrates attributes of users, in accordance with one embodiment.
Figure 5:
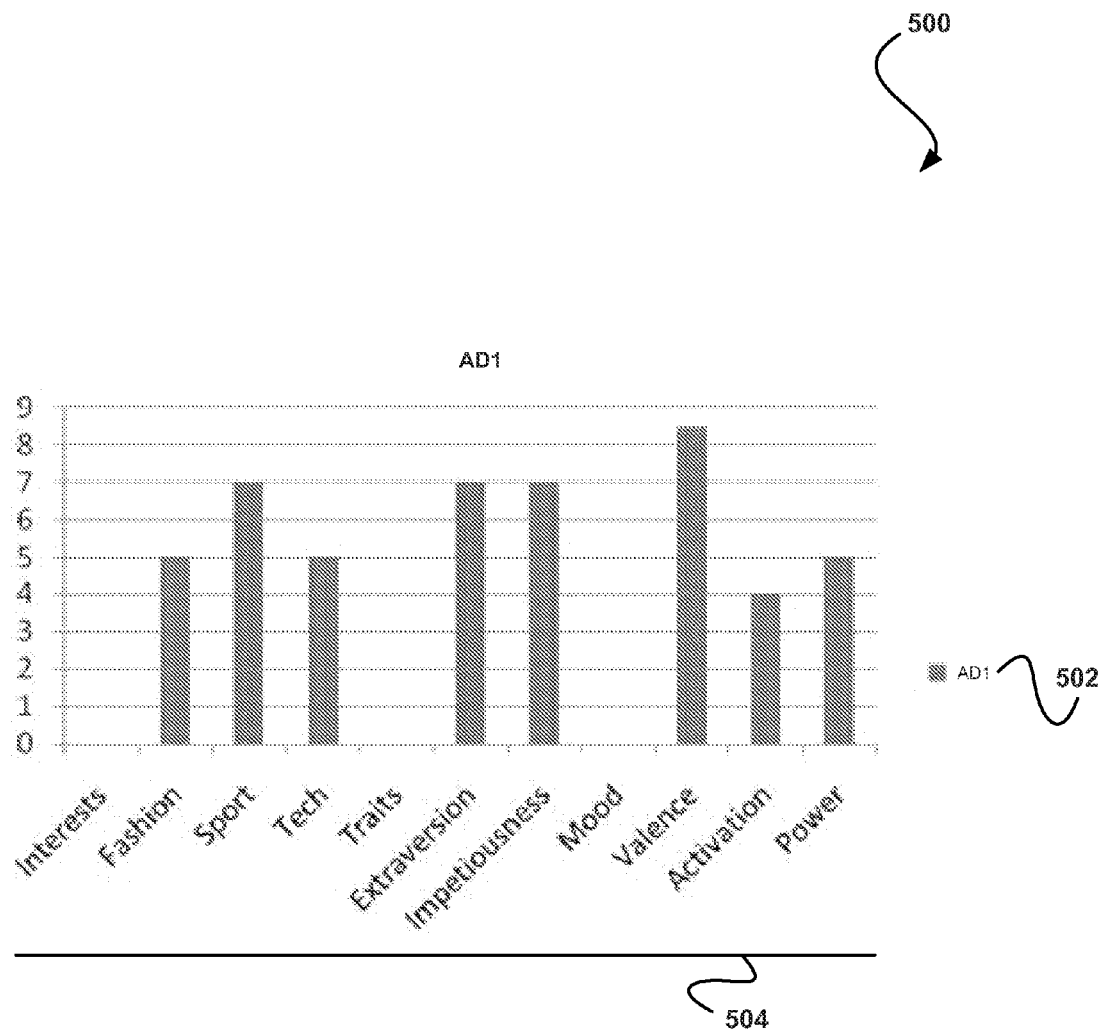
FIG. 5 illustrates results of users clinking on an advertisement, in accordance with one embodiment.

Additionally, in one embodiment, the user may be described as a series of attributes that may be long term (e.g., interests, traits, etc.) and short term (e.g., mood). For example, see FIG. 4, which discloses users 402 and 404 as well as their corresponding attributes 406. Further, content such as advertisements and products may also be described as the average of the attributes of those users that show interest in them. For example, see FIG. 5, which discloses the results 504 of users 402 and 404 from FIG. 4 clicking on advertisement 502. In this way, such attributes may be used to decide to whom advertisement 502 is displayed.

In this way, advertising success rates may be increased by increasing a relevance of advertising shown to users through usage of contextual information associated with the user. Additionally, advertising shown to users may have an increased effectiveness by augmenting contextual information associated with the user with a measure of individual or group-aggregated mood.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 6:
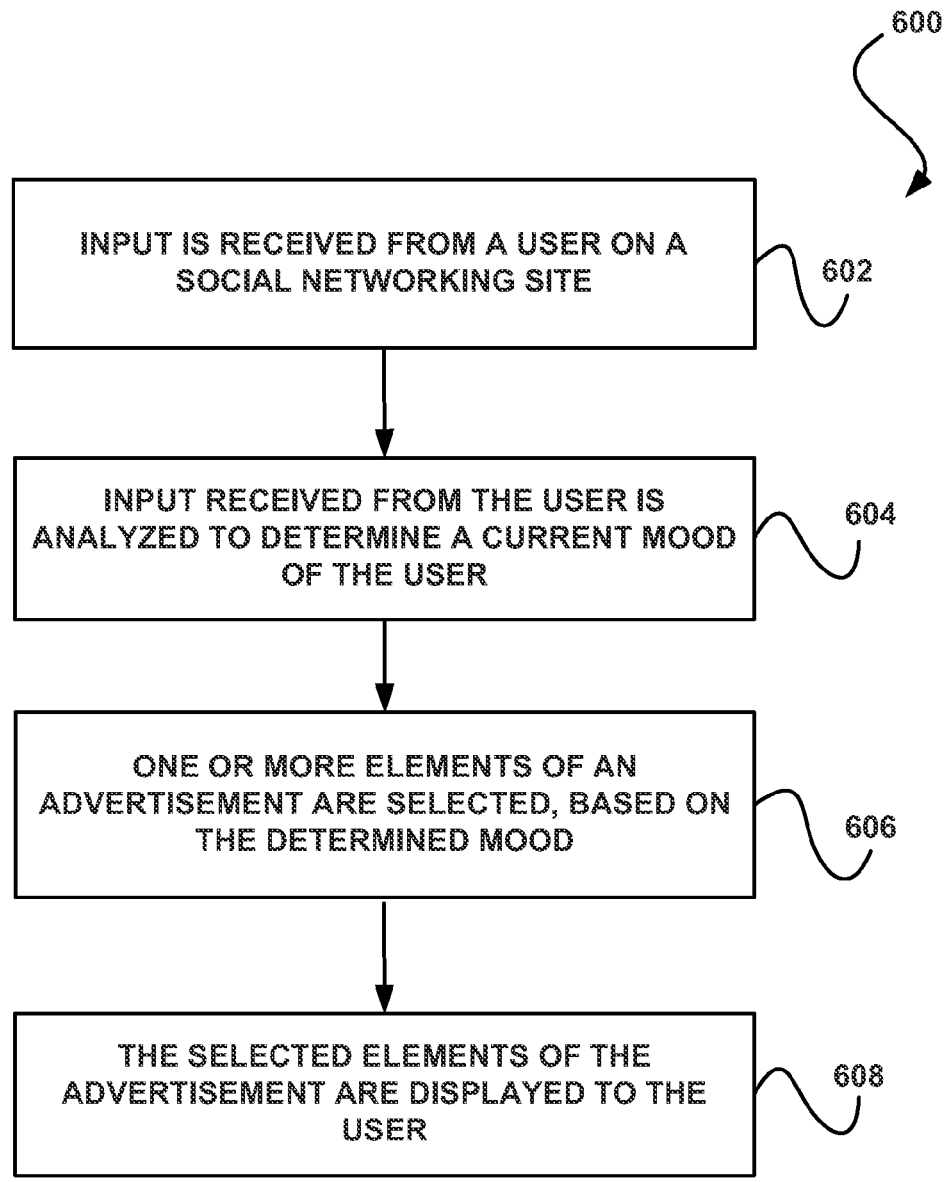
FIG. 6 illustrates a method for personalizing advertising based on a user's mood, in accordance with one embodiment.

FIG. 6 illustrates a method 600 for personalizing advertising based on a user's mood, in accordance with one embodiment. As an option, the method 600 may be carried out in the context of the details of FIGS. 1-5. Of course, however, the method 600 may be carried out in any desired environment. Further, the aforementioned definitions may equally apply to the description below.

As shown in operation 602, input is received from a user on a social networking site. In one embodiment, the user may input text to the social networking site. For example, the user may enter a status update, an opinion about a recent news article, an opinion regarding the current weather, etc. within the social networking site. In another embodiment, the user may input a hyperlink to a news article, a weather report, an image, etc. In another embodiment, the user input may include an expression that is not a direct opinion (e.g., an indication of the weather that may suggest an overall mood of residents subject to that weather, etc.).

Additionally, as shown in operation 604, the input received from the user is analyzed to determine a current mood of the user. In one embodiment, a score may be determined based on an analysis of the input, where the score is indicative of the user's mood. In another embodiment, the user's mood may be classified as a "good" mood or a "bad" mood based on an analysis of the input. For example, the input may include a user's indication that they are upset with the current weather, and an analysis of such input may indicate that the user is currently in a bad mood. In another example, the input may include a user's indication that they are happy with a recent promotion they received at work, and the analysis of such input may indicate that the user is currently in a good mood. In another embodiment, one or more additional moods may affect the score indicative of the user's mood. For example, one or more moods associated with additional users in an area of the user, a social circle of the user, etc. may influence the mood score of the user. In yet another embodiment, the current mood of the user may include an estimate of the mood of the user.

Further, as shown in operation 606, one or more elements of an advertisement are selected, based on the determined mood. In one embodiment, the one or more elements of the advertisement may include the text of the advertisement (e.g., a slogan of the advertisement, etc.). In another embodiment, a plurality of text elements may be associated with the advertisement. For example, a plurality of different advertisement slogans may be associated with a particular advertisement image (e.g., an image of a product being sold within the advertisement, etc.), and one or more of the plurality of advertisement slogans may be selected to be presented with the image based on the determined mood.

For instance, an advertisement image may include an image of a beer, and the plurality of different advertising slogans associated with the image of the beer may include a slogan such as "In a bad mood? Cheer yourself up with a beer," where such slogan is associated with a mood determined to be "bad," as well as a slogan such as "Isn't it a great day? Have a beer to celebrate!", where such slogan is associated with a mood determined to be "good." In another embodiment, a score may be associated with each of the plurality of slogans, and the slogan with the score matching the score indicative of the user's mood (or within a predetermined range of the score indicative of the user's mood) may be selected to be displayed to the user with the advertisement image. In this way, different versions of an advertisement may be selected based on the mood of the user.

Further still, in one embodiment, the one or more elements of the advertisement may include a type of the advertisement. For example, the one or more elements of the advertisement may include a genre of the advertisement, a subject matter of the advertisement, etc. In another embodiment, selecting the one or more elements of the advertisement may include determining a score of one or more different types of advertisements, where the score is indicative of the mood of users who most frequently select the advertisement when it is presented. For example, it may be determined that users in a good mood frequently select (e.g., click on, etc.) advertisements for opera tickets, and as a result, a type of advertisement associated with opera tickets may receive a higher score, where a higher score is associated with a higher likelihood of selection of the advertisement by a user in a "good" mood.

Also, in one embodiment, selecting the one or more elements of the advertisement may include analyzing additional factors associated with the user. For example, it may be determined whether the user may be interested in a more expensive item than the one to be displayed within the advertisement if the user were in a better mood. In another embodiment, the type of the advertisement may be associated with one or more images displayed within the advertisement, one or more sounds played in addition to the advertisement, one or more hyperlinks embedded within the advertisement, or any other element of the advertisement.

In addition, as shown in operation 608, the selected elements of the advertisement are displayed to the user. In one embodiment, the selected elements may be combined to form a single advertisement that is presented to the user. In another embodiment, the selected elements may be displayed to the user in conjunction with search results. For example, the selected elements may be displayed to the user by a search engine in addition to results of a query made by the user. In another example, the search results may be altered in view of the user's selected mood. For example, a paid referral link that includes elements selected based on the determined mood may be displayed to the user as a search query result. In another embodiment, the selected elements may be displayed to the user within the social network site. In another embodiment, the selected elements may be displayed to the user at a web site other than the social network site.

In this way, indicators of a user's mood may be identified and analyzed along with other contextual data in order to personalize recommendations and advertising shown to users.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   identifying by a system data associated with a mood of a user including a present emotional state of the user, where the data includes:
      data contributed to a social network by another user that shares one or more characteristics with the user, and
      one or more historical profiles associated with the user;
   identifying by the system data associated with a mood of a group of users including the user, where the group shares one or more characteristics;
   determining by the system the mood of the user, based on the data, including:
      determining a community score based on the data associated with the mood of the group of users,
      determining an individual score based on the data associated with the mood of the user, and
      aggregating the community score and the individual score to create a score associated with the mood of the user;
   storing by the system in a database a plurality of scores associated with a plurality of elements of an advertisement;
   selecting by the system a subset of the plurality of elements of the advertisement stored in the database by matching the score associated with the mood of the user to the plurality of scores associated with the plurality of elements of the advertisement; and
   providing the plurality of elements of the advertisement from the system to a device of the user.

2. The computer program of claim 1, wherein the data associated with the mood of the user includes data associated with one or more actions performed by the user.

3. The computer program of claim 1, wherein the data associated with the mood of the user includes data contributed by the user to a social network site.

4. The computer program of claim 1, wherein the data associated with the mood of the user includes content consumed by the user.

5. The computer program of claim 1, wherein the data associated with the mood of the user may include a physical location of the user.

6. The computer program of claim 1, wherein the data associated with the mood of the user include one or more of semantic data, data associated with an interest graph, and data associated with an informational environment of the user.

7. The computer program of claim 1, wherein the data associated with the mood of the user is identified my monitoring one or more activities of the user.

8. The computer program of claim 1, wherein the mood of the user is determined utilizing one or more classification and analysis methods in association with the data.

9. The computer program of claim 1, wherein the mood of the user is determined in terms of a positive or negative state of mind.

10. The computer program of claim 1, wherein the score associated with the mood of the user includes a score attributed to an item, where the item score includes a combination of mood scores for all users who have previously consumed the item.

11. The computer program of claim 1, wherein the mood of the user is used as an input into a signature algorithm in order to determine the content to be provided to the user.

12. A method, comprising:
   identifying by a system data associated with a mood of a user including a present emotional state of the user, where the data includes:
      data contributed to a social network by another user that shares one or more characteristics with the user, and
      one or more historical profiles associated with the user;
   identifying by the system data associated with a mood of a group of users including the user, where the group shares one or more characteristics;
   determining by the system the mood of the user, based on the data, including:
      determining a community score based on the data associated with the mood of the group of users,
      determining an individual score based on the data associated with the mood of the user, and
      aggregating the community score and the individual score to create a score associated with the mood of the user;
   storing by the system in a database a plurality of scores associated with a plurality of elements of an advertisement;
   selecting by the system a subset of the plurality of elements of the advertisement stored in the database by matching the score associated with the mood of the user to the plurality of scores associated with the plurality of elements of the advertisement; and
   providing the plurality of elements of the advertisement from the system to a device of the user.

13. A system, comprising:
   a processor for:
   identifying by a system data associated with a mood of a user including a present emotional state of the user, where the data includes:

data contributed to a social network by another user that shares one or more characteristics with the user, and one or more historical profiles associated with the user;

identifying by the system data associated with a mood of a group of users including the user, where the group shares one or more characteristics;

determining by the system the mood of the user, based on the data, including:
    determining a community score based on the data associated with the mood of the group of users,
    determining an individual score based on the data associated with the mood of the user, and
    aggregating the community score and the individual score to create a score associated with the mood of the user;

storing by the system in a database a plurality of scores associated with a plurality of elements of an advertisement;

selecting by the system a subset of the plurality of elements of the advertisement stored in the database by matching the score associated with the mood of the user to the plurality of scores associated with the plurality of elements of the advertisement; and providing the plurality of elements of the advertisement from the system to a device of the user.

14. The system of claim 13, wherein the processor is coupled to a memory via a bus.

\* \* \* \* \*